United States Patent Office 3,216,480
Patented Nov. 9, 1965

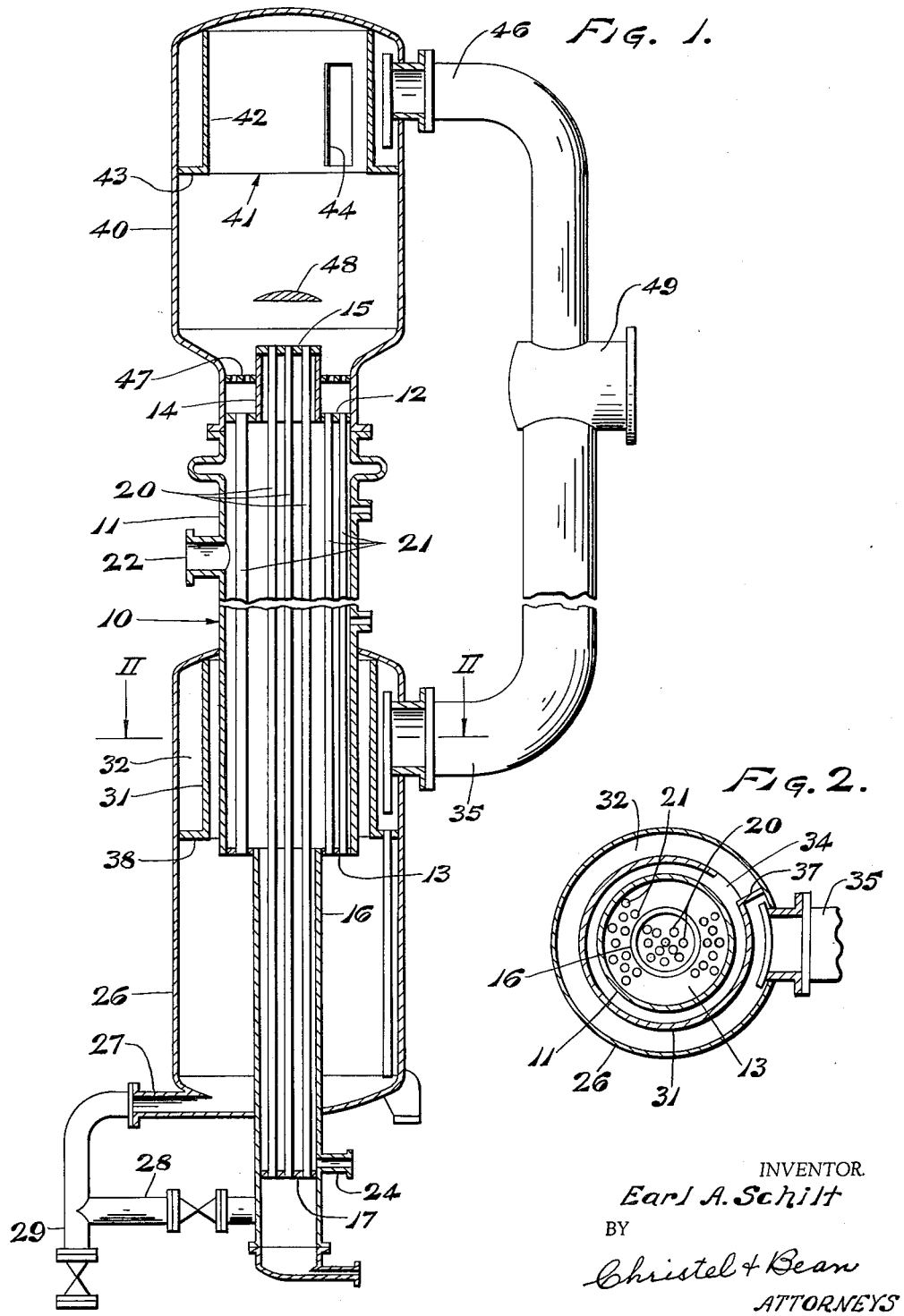

3,216,480
CLIMBING AND FALLING FILM EVAPORATOR WITH INTERMEDIATE SEPARATION
Earl A. Schilt, Kenmore, N.Y., assignor to Zaremba Company, Buffalo, N.Y.
Filed Feb. 18, 1963, Ser. No. 259,239
2 Claims. (Cl. 159—13)

This invention relates to evaporators and more particularly to evaporators which combine climbing and falling film effects in a single evaporator structure, which structure includes means for separating vapor and liquid components between the climbing and falling film effects as well as at the conclusion of the falling film effect.

Theoretically a high degree of thermal efficiency may be attained in evaporator construction by combining climbing and falling film effects through the use of two groups or sets of tubes extending through a common steam chest, one group having a liquor inlet at the bottom and the other a vapor separator and liquor outlet at the bottom. However, such arrangements have not proved generally satisfactory due to ineffective distribution of the vapor-liquor mixture from the climbing film section into the tubes of the falling film section.

I have found that a high degree of overall efficiency is achieved by passing the liquor upwardly through a group of tubes in a climbing film effect, then separating the vapor evolved in such effect, then passing the remaining liquor downwardly through tubes which extend through the same steam chest as the climbing film tubes.

A high degree of heat exchange efficiency and resultant vaporization is achieved in the falling film phase of the operation due to the intermediate separation of vapor evolved in the climbing film phase. Thus proper distribution of the liquor in the falling film section is not inhibited by vapor which, if present, mitigates against obtaining maximum efficiency in the falling film section.

By employing climbing and falling film sections in a single evaporator structure employing a common steam chest and with fluid traversing the two sections in a single pass, a high rate of evaporation is achieved with a minimum of undesirable efficiency-lowering factors such as pressure and velocity losses, heat losses and the like.

The present invention provides a novel evaporator construction and arrangement which facilitates the provision of combined climbing and falling film effects with intermediate vapor separation between the climbing and falling film sections and a final vapor separation after the falling film section.

Numerous constructional and operational advantages of the apparatus of the present invention will become apparent to those skilled in the present art from a consideration of the form of evaporator illustrated in the accompanying drawing and described in the following specification. However, it is to be understood that this single embodiment is set forth by way of example only and that various modifications may be made without departing from the principles of the present invention, the scope of which is limited only as defined in the appended claims.

In the drawings:

FIG. 1 is a general central vertical cross-sectional view through one form of a climbing and falling film evaporator constructed in accordance with the principles of the present invention; and FIG. 2 is a horizontal cross-sectional view taken approximately on the line II—II of FIG. 1.

Referring first particularly to FIG. 1, the numeral 10 designates generally the heat exchanger or steam chest portion of the evaporator which comprises a central steam chest casing 11 having annular upper and lower headers or tube sheets 12 and 13. An upper cylindrical extension casing 14 is secured at its lower end in the central opening of upper annular tube sheet 12 and has a header or tube sheet 15 at its upper end. Similarly, a lower cylindrical extension casing 16 is secured at its upper end in the central opening of the lower annular tube sheet 13 and has a header or tube sheet 17 at its lower end. Thus the steam chest 10 comprises a cylindrical central portion with upper and lower extensions of reduced diameter.

A plurality of tubes 20 extend between the lowermost and uppermost tube sheets 17 and 15 and comprise the climbing film portion of the evaporator while a further plurality of tubes 21 arranged annularly about the tubes 20 extend between the upper and lower tube sheets 12 and 13 of the main central portion of the steam chest, comprising the falling film portion of the evaporator. Both sets of tubes are enveloped in steam which enters the upper end of the main central portion of the steam chest at 22. The condensate from the steam thus employed in heating the tubes 20 and 21 is drained from the composite steam chest at the lower end of the lower extension thereof, as at 24.

As indicated generally in the preamble to this specification, vapor is diverted from the apparatus both after the climbing film phase and after the falling film phase, that is, after each passage of the liquor through the steam chest. Reference will first be had to the vapor diverting means at the lower end of the apparatus which comprises the final vapor separation and is generally similar to the separation arrangement shown and described in my prior United States Patent No. 2,624,401, dated January 6, 1953.

In FIG. 1 the numeral 26 designates a cylindrical receiving chamber which surrounds the lower portion of the central steam chest casing 11 and through which the lower extension casing 16 extends. Vaporized and unvaporized portions of the liquor discharging from the falling film tubes 21 is received in chamber 26. The unvaporized residue falls to the bottom of receiving chamber 20 and is drawn off at outlet 27 from which it may be recirculated through a conduit 28 or may pass to another evaporator in a multiple effect arrangement or may merely be discharged from the system by means of a conduit 29.

In FIG. 1 the numeral 31 designates a circular wall spaced radially inwardly with respect to the wall forming the receiving chamber 26 to form a centrifugal entrainment separating chamber 32 which, as shown in FIG. 2, has a vapor entrance passage 34 and a discharge duct 35. A radial wall portion 37 separates the entrance and discharge portions of the separator and a bottom wall 38 completes the separating chamber 32.

A generally similar centrifugal entrainment separator is provided at the upper end of the apparatus and comprises generally an intermediate receiving chamber 40 which receives material issuing from the upper ends of the climbing film tubes 20. The upper centrifugal entrainment separator is designated generally at 41 and comprises a cylindrical wall 42 spaced inwardly from the outer wall of upper receiving chamber 40, a bottom wall 43 and an entry opening 44. As in the case of the lower separator a radial wall (not shown) separates the entry and discharge portions of the annular centrifugal separator chamber.

The portion of the liquor which emerges from the upper ends of the climbing film tubes 20 as vapor is thus separated and discharged into a conduit 46 while the remainder falls to a perforated annular distributor plate 47 which surrounds the upper extension casing 14 and distributes the unvaporized liquid over the entry ends of the falling film tubes 21. A central baffle 48 arrests unevaporated droplets passing upwardly from tubes 20 to reduce entrainment with vapor passing to the separator 41.

The vapor which is thus taken from the top of the evaporator between the climbing and falling film phases may be combined with the vapor which is separated from the residue liquor at the bottom of the evaporator as at 49 in FIG. 1. The subsequent condensation or other treatment of the vapor is immaterial to the purposes of the present invention. Merely by way of example, the vapor discharging from the apparatus at 49 may pass to a condenser and then to a steam jet air ejector or other means for withdrawing vapor and such withdrawal may be at a rate sufficient to reduce the pressure in the evaporator in instances where evaporation is to be carried on at subatmospheric pressures.

In place of the centrifugal entrainment separators shown in the preferred form of the invention illustrated and described herein, entrainment separators of other types may be employed, such for instance as mesh type entrainment separators.

I claim:

1. In an evaporator, a steam chest having a central portion of generally vertical cylindrical form and cylindrical axial extensions of reduced diameter at opposite ends thereof, an annular tube sheet at each end of said central portion connecting the latter with said cylindrical extensions, and a tube sheet at the outer end of each of said extensions, a group of tubes extending between the latter tube sheets, and a second group of tubes extending between said annular tube sheets, liquor inlet means at the lower end of said first group of tubes, a receiving chamber in communication with the upper ends of both groups of tubes, an entrainment separator associated with said receiving chamber for removing vapor issuing from said first group of tubes, the unvaporized liquor issuing from said first group of tubes gravitating to the upper ends of said second group of tubes, a receiving chamber at the lower end of said steam chest in communication with the lower ends of said second group of tubes, and an entrainment separator associated with said last mentioned receiving chamber for removing vapor issuing from the lower ends of said second group of tubes from unvaporized residual liquor.

2. In an evaporator, a heating chamber having a central portion and extensions of reduced diameter at opposite ends thereof, tube sheets at opposite ends of said central portion having openings therein connecting with said extensions, and a tube sheet at the outer end of each of said extensions, a group of tubes extending between the latter tube sheets, and a second group of tubes extending between the first-mentioned tube sheets, liquor inlet means at the lower end of said first group of tubes, a receiving chamber in communication with the upper ends of both groups of tubes, an entrainment separator associated with said receiving chamber for removing vapor issuing from said first group of tubes, the unvaporized liquor issuing from said first group of tubes gravitating to the upper ends of said second group of tubes, a receiving chamber at the lower end of said heating chamber in communication with the lower ends of said second group of tubes, and an entrainment separator associated with said last mentioned receiving chamber for removing vapor issuing from the lower ends of said second group of tubes from unvaporized residual liquor.

References Cited by the Examiner

UNITED STATES PATENTS

| | | | |
|---|---|---|---|
| 940,473 | 11/09 | Parker | 159—14 |
| 1,005,571 | 10/11 | Parker | 159—13 |
| 2,336,832 | 12/43 | Badenhausen | 122—34 |
| 2,624,401 | 1/53 | Schilt | 159—13 |
| 2,703,610 | 3/55 | Cross | 159—13 X |
| 2,774,575 | 12/56 | Walter | 165—163 X |

FOREIGN PATENTS

| | | |
|---|---|---|
| 904,812 | 11/45 | France. |
| 135,679 | 11/02 | Germany. |
| 141,819 | 4/60 | Russia. |
| 96,000 | 6/39 | Sweden. |

NORMAN YUDKOFF, *Primary Examiner.*